United States Patent [19]

Mein

[11] Patent Number: 4,597,955
[45] Date of Patent: * Jul. 1, 1986

[54] PROCESS FOR RECOVERING CESIUM FROM CESIUM ORE

[75] Inventor: Peter G. Mein, LaSalle, Ill.

[73] Assignee: Carus Corporation, LaSalle, Ill.

[*] Notice: The portion of the term of this patent subsequent to May 8, 2001 has been disclaimed.

[21] Appl. No.: 729,463

[22] Filed: May 1, 1985

[51] Int. Cl.$^4$ .............................................. C01G 45/12
[52] U.S. Cl. .................................... 423/184; 423/179; 423/198; 423/421; 423/599
[58] Field of Search .............. 423/599, 600, 499, 179, 423/184, 421, 199, 198

[56] References Cited

U.S. PATENT DOCUMENTS

| 956,120 | 4/1910 | Machalske | 423/599 |
|---|---|---|---|
| 4,447,406 | 5/1984 | Mein | 423/198 |

OTHER PUBLICATIONS

Dean et al., (1964).
Arnold et al., (1965), "Solvent Extraction of Cesium (and Rubidium) from Ore Liquors with Substituted Phenols".
Davis et al., (1966), "Production of Cesium Salts".

Primary Examiner—John Doll
Assistant Examiner—Wayne A. Langel

[57] ABSTRACT

Cesium is recovered from a cesium-bearing mineral such as pollucite by roasting with an alkaline flux to convert the cesium to a soluble salt, extracting the cesium salt with water, and separating the cesium solution from the residual solids. Water-soluble permanganate is then added to the cesium solution to selectively precipitate cesium permanganate, giving other soluble metal compounds in solution. Cesium permanganate of high purity is recovered by separation from the residual solution. The cesium permanganate can be converted to other cesium compounds.

12 Claims, No Drawings

PROCESS FOR RECOVERING CESIUM FROM CESIUM ORE

RELATED PATENT AND DISCLAIMER

This application is related to my U.S. Pat. No. 4,447,406, issued May 8, 1984. The balance of the term of any patent issuing on this application after May 8, 2001, is hereby disclaimed.

FIELD OF INVENTION, BACKGROUND, AND PRIOR ART

The field of this invention relates to the recovery of cesium from cesium-bearing minerals such as pollucite. More specifically, this invention relates to an improvement in such recovery processes wherein the cesium ore is roasted with an alkaline flux and then leached with water to extract solubilized cesium.

Liberation of cesium from pollucite or other cesium-containing minerals has involved extraction with a strong acid, such as hydrochloric or sulfuric acids, or the roasting of the ore with an alkaline flux to convert the cesium to a watersoluble form, such as cesium chloride or cesium carbonate, followed by a water extraction to solubilize cesium. Processes for the recovery of cesium from pollucite and other cesium-containing minerals were reviewed by J. J. Kennedy in *Chemical Reviews*, Vol. 23 (1938), Pages 157-163. More recent technical developments were summarized by R. A. Heindl, *Bureau of Mines Bulletin* 650, "Mineral Facts and Problems" (1970 ed.), pages 527-534.

Alkaline flux roasting processes are described in Dean et al., "Dissolution and Roasting Techniques for Extracting Cesium from Pollucite Ores" (1964), U.S. Dept. of Interior, Bureau of Mines, Report 6387; Arnold, et al., *I&EC Process Design and Development* (1965) 4:249-254; and Davis and Jones, *Bureau of Metals*, November, 1966, pages 1203-1206. Useable alkaline fluxes may include $CaO/CaCl_2$; $CaCO_3/CaCl_2$; $NaCl/Na_2CO_3$; $NaOH/Na_2CO_3$; $NaOH/NaCl$; $K_2CO_3$; and $Na_2CO_3$ with a $NaHCO_3$ leach. While all of these alkaline fluxes are effective for liberation of the cesium as a soluble chloride, carbonate, or bicarbonate salt, better recoveries appear to be obtained with $CaO/CaCl_2$ or $NaCl/Na_2CO_3$ fluxes, which convert the cesium to a CsCl. Extraction with water under alkaline conditions liberates most of the cesium in solubilized form.

Since pollucite ore contains substantial amounts of other alkali metals besides cesium, such as rubidium, and potassium or sodium, as well as substantial amounts of polyvalent metals, primarily aluminum but also iron, acid leaching results in an extract containing the soluble cesium salt in admixture with other alkali metal and polyvalent metal salts. The efficient recovery of the cesium values from such extracts has therefore presented the art with a difficult problem, since it is desired to obtain the recovered cesium compound in as pure a form as possible for further processing to commercial cesium products, such as cesium chloride, cesium iodide, cesium carbonate, cesium sulfate, and also metallic cesium.

Roasting of pollucite with an alkaline flux followed by extraction under alkaline conditions, as described above, has the advantage that the aluminum and iron remains insolubilized as hydroxides. However, alkaline metals in addition to cesium are solubilized, viz. rubidium, potassium, and sodium. The leaching solution will also contain the calcium, sodium, or potassium salts or hydroxides present in or formed by the roasting fluxes. Therefore, a problem of separating the cesium from other soluble metal salts and hydroxides is also encountered in this recovery process. The solubilized cesium may be precipitated as cesium alum, or it may be extracted with an alkyl phenol. However, these processes have proven to be difficult and expensive for commercial application. There has been a recognized need for an improved process for recovering cesium from pollucite in a highly purified form. The need for such a process improvement has been emphasized in recent years by the increasing uses of cesium and cesium compounds, and by the projected expansion of these uses.

SUMMARY OF INVENTION

The process of this invention starts with the known steps of roasting the cesium-bearing ore with an alkaline flux to form a water-soluble cesium salt, and extracting the roasted ore with water to obtain an aqueous solution of the cesium salt together with other soluble metal salts and hydroxides. Following the preparation of this cesium-containing alkaline extract, the process of the invention departs from prior art processes of others.

The alkaline extract, which will usually contain the cesium in the form of a chloride, carbonate, or bicarbonate salt, will also contain the corresponding salts and hydroxides of metals extracted with the cesium from the ore, including rubidum, potassium, and sodium, as well as the metal salts and hydroxides of the residual roasting reagents. However, in accordance with the present invention, the cesium can be precipitated in high purity by adding a water-soluble permanganate, such as sodium permanganate. The cesium is selectively precipitated while leaving the other alkali metal and alkaline earth metal chlorides, carbonates, bicarbonates, or hydroxides in solution. The precipitated cesium permanganate can be readily separated from the residual solution. The resulting cesium permanganate has a high degree of purity, and is substantially free of other metals.

The recovered cesium permanganate can be sold as a final product, or it can be further processed to prepare other commercially important cesium compounds. By reacting the cesium permanganate with a permanganate reducing agent, cesium carbonate ($Cs_2CO_3$) can be formed together with cesium delta manganese dioxide. In one procedure for carrying out this reduction, a slurry of the $CsMnO_4$ is formed in an aqueous alkaline solution containing the reducing agent, which conveniently may be a water-soluble organic compound such as methanol. The resulting cesium carbonate solution can be separated from the solid-phase cesium delta manganese dioxide. The cesium carbonate can be recovered viz. by evaporation and crystallization. Further, cesium can be removed from the cesium delta manganese dioxide by ion exchange using aqueous solutions of acids or appropriate metal salt solution. In this way, other commercially desirable inorganic salts of cesium may be obtained.

DETAILED DESCRIPTION

The preferred starting material for the process of the present invention is pollucite ore. However, other cesium-bearing minerals can be used as starting materials, although they are of lower cesium content, such as lepidolite and carnallite.

The content of cesium in crude pollucite ore varies over a considerable range, such as from 5 to 32 weight percent $Cs_2O$. Although not required for the purpose of the present invention, the cesium content of the starting material for the hydrochloric acid extraction may be upgraded by froth flotation to separate the pollucite from non-pollucite minerals. See Kirk-Othmer, *Encyclopedia of Chemical Technology*, Vol. 5, 327-338, at 330 (3rd ed. 1979).

The theoretical structure of pure pollucite is $Cs_2O \cdot Al_2O_3 \cdot 4SiO_2$. Natural pollucite, however, contains varying amounts of rubidium, potassium, and sodium in the pollucite crystal structure, the $Cs_2O$ being replaced by $Rb_2O$, $K_2O$, or $Na_2O$. Natural pollucite also contains some iron, usually in the form of an iron oxide. Crude pollucite ore is a heterogeneous material. It is therefore a particular advantage of the process of the present invention that no upgrading of crude pollucite ore is required, and that, in fact, the preferred starting material is crude pollucite ore.

The crude pollucite ore, upgraded pollucite, or other cesium-bearing mineral is crushed and ground to a state of fine subdivision. For example, the particle size may be minus 200 mesh (American Standard Screen). It will be understood, however, that although the particle size is not critical, a fine state of subdivision is advantageous to facilitate rapid contacting of the hydrochloric acid with the cesium values to be solubilized.

The finely divided cesium-bearing starting material is subjected to roasting with an alkaline flux. A preferred flux comprises a mixture of lime (CaO) and calcium chloride ($CaCl_2$). However, as described in the above-cited literature references, Dean et al. (1964); Arnold et al. (1965), and Davis and Jones (1966), a wide variety of other alkaline fluxes can be used with reasonable efficiency. In general, it is preferred to have a chloride salt present in the flux, such as calcium chloride or sodium chloride, and also an alkali such as an oxide, hydroxide, or carbonate of an alkali or alkaline earth metal. Another effective flux is composed of a mixture of sodium chloride (NaCl) with sodium carbonate ($Na_2CO_3$) Alkaline reagents may also be used alone such as sodium or potassium carbonate ($Na_2CO_3$; $K_2CO_3$), and in conjunction with such fluxes it may be desirable to use a bicarbonate solution for the extraction, such as sodium bicarbonate ($NaHCO_3$).

For the roasting process, relative proportions of the ore to the flux are not highly critical. For example, from two to five parts of the flux may be employed per part by weight of pollucite. A typical ratio is around three parts of total flux per part of pollucite Where the flux contains the chloride salt, such as calcium or sodium chloride in combination with alkaline compound such as calcium oxide or sodium or calcium carbonate, each of the reagents may comprise from as little as 25 per cent by weight to as much as 75 per cent by weight of the flux. For example, a typical effective ratio of pollucite: $CaCl_2$:CaO is 1:1:2–3 relative parts by weight. If calcium carbonate is substituted for lime, it will be converted to lime during the roasting. An example of effective proportions are two parts limestone to one part ore with ½ part calcium chloride. Another example is one part of pollucite with two parts NaCl and one part $Na_2CO_3$.

Roasting temperatures are typically in the range of about 700°–800° C. However, lower and higher temperatures can be employed. For further details on roasting temperatures and procedures and equipment, reference may be had to the above-cited literature references. In general, these preliminary steps are carried out in accordance with prior art practice.

For the extraction, a slurry can be formed from the roasted ore by the addition of water. Extraction may be obtained at temperatures from 0° to 100° C. Typical extraction temperatures are in the range from 25° to 97° C. Since the slurry will usually be formed from the roasted ore while still warm, higher temperatures will usually be used, and this is preferred, such as extraction temperatures from about 40°–70° C. The solids concentration of the slurry as initially formed is not critical. Slurry densities can range from 20 to 60% solids by weight. Solids concentrations from about 35 to 50% by weight are typical. Dissolving of the cesium compounds can be carried out rapidly with extraction times of 15 to 45 minutes. Longer extraction times can be used if desired.

After substantially all of the soluble cesium has been extracted from the ore in the form of its chloride, carbonate, or bicarbonate salt, the residual solids are separated from the supernatant solution. During the extraction and separation of the solids, the pH will usually be at a strongly alkaline pH, such as a pH from 9.5 to 10.5. At these highly alkaline pH's, the aluminum and iron constituents of the ore are insolubilized as hydroxides and can be separated with the ore residue.

Separation may be performed by any of the standard procedures, such as settling and decantation, as a preliminary step, and additionally or alternatively by filtration or centrifugation. The objective is to obtain a substantially solids-free extract containing the soluble cesium in admixture with other soluble metal salts and hydroxides. The extract will usually include appreciable amounts of rubidium, potassium, and sodium salts extracted from the ores, as well as the soluble residues of the flux reagents such as calcium, sodium, or potassium, hydroxides or carbonates.

The recovery of the cesium may be carried out without pH adjustment. However, if the pH is adjusted, very low acid pH's at which permanganate is not stable should be avoided. In general, the pH should be above about 2.5 to 3.0. Usable pH's therefore include pH's within the range from at least 3.0 to 11.0. Preferably, however, no pH adjustment is made, and the next step of the process is carried out at alkaline pH, such as a pH from about 9.5 to 10.5.

According to the novel feature of this invention, a water-soluble permanganate salt is added to the extract of the solubilized cesium and other metal compounds. Potassium permanganate ($KMnO_4$) is the preferred reagent, but other water-soluble permanganate salts can be used, such as sodium, or calcium, or barium permanganates. But potassium permanganate is commonly the least expensive and most readily available of the water-soluble permanganates.

The permanganate ion reacts with the cesium ion to form highly water-insoluble cesium permanganate ($CsMnO_4$), which readily precipitates from the supernatant solution. The precipitation is selective in the presence of other alkali metal and alkaline earth metal salts and hydroxides, including those of sodium potassium, rubidium, and calcium. For example, the formation of the cesium permanganate may be carried out as a crystallization procedure, the reaction being performed in a crystallizer under conditions favoring crystal formation. Precipitation temperatures are not especially critical, and may range from 20° C. to 80° C. On the basis of present information, it is believed that the best temperature conditions are from about 40 to 70° C.

After completion of the formation of the insoluble cesium permanganate, such as by the production of cesium permanganate crystals in a suitable crystallizer apparatus, the $CsMnO_4$ solids are recovered by a suitable separation procedure such as centrifugation or filtration. The separated $CsMnO_4$ solids may be washed with water to remove residual solution and soluble material, and thereby enhance the purity of the recovered cesium permanganate.

The process of this invention is further illustrated by the following examples.

EXAMPLE I

Ground pollucite is calcined in an alkaline flux at high temperature to convert the cesium oxide to cesium chloride, which as a soluble cesium compound can be leached with water to separate it from the ore gangue, as follows: 1430 lb. pollucite (21% cesium) was mixed with 390 lb calcium chloride (anhydrous) and 1450 lb calcium oxide in a ribbon blender. The weight ratio of pollucite:calcium chloride:calcium oxide was 1:0.27:1; and molar ratio of Cs in pollucite:$CaCl_2$:CaO was 1:2:15. The 3270 lb of uncalcined material (9.17% Cs, 12.43% Si, 19.78% Ca, 5.82% Al) were calcined twice (to ensure high extraction) in a rotary drum calciner at 800° C.; the retention time of one calcination was −45 minutes. When calcination was complete, the material was allowed to cool to room temperature, and leached in 4647 lb (2108 L) water at boiling for 1 hour, filtered and washed with 317 lb (111 L) water. The leached solids (10% moisture) were dried and analyzed. The dried leached cake contained 2.46% Cs, 22.19% Si, 24.41% Ca, 6.21% Al. The filtrate and wash combined consisted of 4970 lb solution.

The 4970 lb filtrate and wash water (2155 liters, analysis: 54 g/L Cs, 5.8 g/L Na, 0.01 g/L Al, 2.6 g/L Ca, specific gravity 1.047 g/ml and pH = 11.0) were heated to 65° C. and 380 lb $KMnO_4$ (25% excess) were added as solid to precipitate the cesium in the solution as $CsMnO_4$. The reaction mixture was reacted for an hour at 65° C and then cooled to room temperature. The pH of the reaction mixture was about 11. The formed $CsMnO_4$ was separated from the liquid by filtration. The filter cake was washed with twice its volume water and consisted now of 555 lb wet $CsMnO_4$ (analysis: 43.82% Cs, 0.01% Na, 0.001% K, 0.05% Ca and 13% moisture). The 555 lb. $CsMnO_4$ filter cake was dried at 80° C. The dried $CsMnO_4$ was analyzed and was found to be 99% pure.

Since 0.001 grams/liter Si were found in the leachate, the extraction was calculated as follows: The uncalcined mixture (analysis above) had a Si:Cs molar ratio of 1:0.156 and the calcined leached mixture (analysis above) a Si:Cs molar ratio of 1:0.0234. This represents a cesium extraction of 85% from the pollucite.

EXAMPLE II

Ground pollucite is calcined in an alkaline flux at high temperature to convert the cesium oxide to cesium chloride, which as a soluble cesium compound can be leached with water to separate it from the ore gangue, as follows: pollucite, calcium chloride and calcium carbonate were mixed in a weight ratio of pollucite:calcium chloride:calcium carbonate of 1:0.5:2. The molar ratio of Cs in pollucite:$CaCl_2$:$CaCO_3$ was 1:3.4:13.6. The mixture was calcined in a tube furnace for 1 hour. The calcined mixture was leached in water at boiling for 1 hour, filtered and washed with water. The leached solids were dried and analyzed. The dried leached cake contained 0.54% Cs, 11.26% Si, 4.01% Al, 27.96% Ca. The filtrate and wash water were combined and heated to 65° C. Solid $KMnO_4$ was added to the filtrate-wash solution to precipitate the cesium as cesium permanganate. The reaction mixture was reacted for one hour at 65° C. and then cooled to RT. The formed $CsMnO_4$ was separated from the liquid by filtration. The filter cake was washed with twice its volume water and dried at 80° C. The dried $CsMnO_4$ was analyzed and found to be 99% pure.

The extraction was calculated as in Example I, and was found to be approximately 93% from the pollucite.

EXAMPLE III

Ground pollucite is calcined in an alkaline flux at high temperature to convert the cesium oxide to cesium chloride, which as a soluble cesium compound can be leached with water to separate it from the ore gangue, as follows: pollucite, sodium chloride, and sodium carbonate were mixed in a weight ratio of pollucite:sodium chloride:sodium carbonate of 1:1.2:1.8. The molar ratio of Cs in pollucite:NaCl:$Na_2CO_3$ was 1:13:10.7. The uncalcined mixture was analyzed and found to contain 5.04% Cs, 2.2% Al, and 6.58% Si. The mixture was calcined in a tube furnace for 1 hour. The calcined mixture was leached in water at boiling for 1 hour, filtered and washed with water. The leached solids were dried and analyzed. The dried leached cake contained 1.21% Cs, 16.1% Al and 15% Si. The filtrate and wash water were combined and heated to 65° C. Solid $KMnO_4$ was added to the filtrate-wash solution to precipitate the cesium as cesium permanganate. The reaction mixture was reacted for one hour at 65° C. and then cooled to RT. The formed $CsMnO_4$ was separated from the liquid by filtration. The filter cake was washed with twice its volume water and dried at 80° C. The dried $CsMnO_4$ was analyzed and found to be 99% pure.

The extraction was calculated as in Example I, and was found to be approximately 90% from the pollucite.

FURTHER PROCESSING STEPS

The cesium permanganate prepared as described may be sold as a commercial product, or it may be further processed to prepare other commercially desirable cesium compounds. Such further processing involves an initial key reaction in which the cesium permanganate is reacted with a permanganate reducing agent. The product of the reduction is cesium carbonate, which is a commercial product, and also cesium delta manganese dioxide, from which cesium can be recovered. In preferred embodiments, therefore, such further processing is a desirable part of the present invention, and will now be described in further detail.

Cesium permanganate can function as a solid-phase oxidizing agent, and can be reacted with virtually any oxidizable compound. The oxidizable compounds function as reducing agents, and may be reacted in liquid, gaseous, or solid-phase reactions, such reducing agents include compounds containing carbon, hydrogen, or both carbon and hydrogen, which are oxidized to carbon dioxide and/or water by permanganate. While the reducing agent may be in the form of a gas, such as carbon monoxide, or hydrogen gas, a presently preferred procedure is to use a water-soluble reducing agent, and to dissolve the reducing agent in an aqueous alkaline solution for contacting with the solid-phase cesium permanganate. Such water-soluble reducing agents include, for example, starches, sugars, methanol, formic acid, or formaldehyde.

Using an aqueous slurry, the solid particles of the cesium permanganate can be dispersed in water containing the dissolved reducing agent. The pH of the aqueous phase can range from 4 to 12, but a moderately alkaline pH is preferred, such as pH 8.0 to 10.0. The temperature of the reduction is not highly critical, but may range, for example, from 20 to 100° C. The presently preferred temperature is from about 60 to 80° C.

The reduction reaction using methanol as the reducing agent and an aqueous alkaline solution can be represented by the following equation.

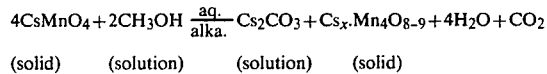

(solid) (solution) (solution) (solid)

In the above equation, the cesium delta manganese dioxide product is represented by a generalized formula. The cesium content represented by the letter "x" may vary from 0.8 to 2 moles per each 4 moles of manganese, and the oxygen content may correspondingly vary from 8 to 9 moles of oxygen. To maximize the amount of cesium carbonate obtained and to minimize the amount of cesium associated with the manganese dioxide is a desirable objective. However, the cesium can be recovered from the delta manganese dioxide by treating this product with acids or metal salt solution to replace the cesium in an ion-exchange-type reaction. By employing a reaction pH of from 4 to 7, and a temperature of from about 20° to 90° C., delta manganese dioxide can be obtained containing less than 1 mole of cesium per each 4 moles of manganese.

The aqueous solution of the cesium carbonate is separated from the reaction solids, comprising the cesium delta manganese dioxide, by centrifugation or filtration. Thereafter, the cesium carbonate can be recovered in solid form by evaporation and crystallization procedures.

The remaining cesium associated with the manganese dioxide may be recovered by treating the delta manganese dioxide with an acid or polyvalent metal salt solution. The acid or polyvalent metal salt solution may be selected so that the anion will form a desired salt with the cesium, such as sulfuric acid or manganese sulfate to obtain cesium sulfate, hydrochloric acid or manganese chloride to obtain cesium chloride, nitric acid or manganese nitrate to obtain cesium nitrate. These reactions are represented by the following equations (A) and (B) in which a delta manganese dioxide containing 2 moles of cesium per 4 moles of manganese is reacted with sulfuric acid or manganese sulfate to obtain cesium sulfate as the product.

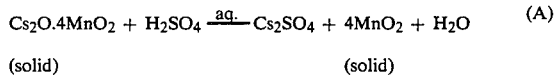

(solid) (solid)

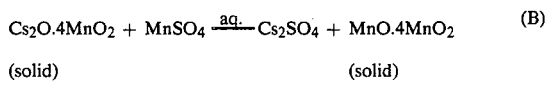

(solid) (solid)

The reactions represented by the above equations are preferably carried out at temperatures of from about 20° to 50° C., but in certain embodiments temperatures up to 80° C. can be used. In the reaction of equation (A), since the acid is the reactant, the reaction will be carried out an an acid pH, usually a strong acid pH in the range from about 1 to 3. However, the reaction will proceed at any acid pH below 7.0. The reaction of equation (B) will also be at an acid pH below 7.0. The resulting manganate product will be in an acid form, which may be represented as: $MnO_2 \cdot xH_2O$.

In general, any strong acid can be used in the reaction of equation (A), including in addition to sulfuric acid, the other mineral acids (viz. nitric, hydrochloric, etc.). Any water-soluble polyvalent metal salt of a strong mineral acid can be substituted for the $MnSO_4$, such as cobalt, copper or nickel sulfate, nitrate, or chloride. Equations (A) and (B) can be used as a reaction sequence where not all of the cesium is recovered by reaction (A). It is believed to be preferred, however, to employ only reaction (B), which can result when used without reaction (A) in a substantially complete recovery of the cesium.

The cesium sulfate solution as obtained in reactions (A) and (B) can be separated from the manganese dioxide solids by centrifugation or filtration. The cesium sulfate or other cesium salt can then be recovered by evaporation and crystallization procedures.

In an alternative process embodiment, the $CsMnO_4$ can be reduced with a solid or gaseous reductant, and the $Cs_2CO_3$ leached from the converted solids by aqueous extraction, leaving the cesium delta manganese dioxide as the residue, which can be further processed as described above.

Further processing of cesium delta manganese dioxide is illustrated by the following examples.

EXAMPLE V 100 g $CsMnO_4$ (52.40% Cs, 21.66% Mn, 0.13% K, 0.07% Rb, 0.056% Al, 0.035% Na, 0.001% Fe) was suspended in 400 ml $H_2O$ in a 1 liter beaker. The suspension was stirred and its pH adjusted to 13 with 6.9 g CsOH in 14 ml water. It was heated to 60° C and 12.7 g $CH_3OH$ in 12.7 ml water were gradually added within 45 minutes. The reaction mixture was stirred and kept at 60° C. for another 10 min. or until all seven-valent manganese was reduced to four-valent manganese. If the reduction of the $CsMnO_4$ is carried out at room temperature, the reduction process will be extended. The solids were separated from the liquid by filtration through a medium-porosity buchner filter funnel, it was washed with 50 ml water and 146 grams filter cake (17.9% Cs, 14.85% Mn, 0.58% Rb) and 360 ml filtrate and wash (65.6 g/l Cs, 0.06 g/l Rb, 0.05 g/l K, 0.002 g/l Na, 0.0006 g/l Mn) were obtained. The cesium extraction from the $CsMnO_4$ is at this point 50% and the molar ratio of Mn:Cs in the filter cake is 1:0.5.

The $Cs_2CO_3$ in the filtrate can be recovered as such or be converted into any suitable cesium compound by addition of the corresponding acid followed by evaporation and crystallization.

The 146 g filter cake was suspended in 200 ml water and pH-adjusted to 0.6 with 27.3 g 50% $H_2SO_4$. The reaction mixture was stirred for several hours and then filtered through a medium-porosity filter funnel. It was washed with 100 ml water and 106 g filter cake (20.4% Mn, 5.92% Cs), and 350 ml filtrate containing 73 g/l $Cs_2SO_4$ were obtained, which is another 38% cesium extraction. The total extraction of cesium from the $CsMhO_4$ was 88%, leaving 12% in the $MnO_2$. Higher acid concentration did not improve the extraction yields significantly. The filtrate was pH-adjusted to 7 with a solution containing 79.7 g/l $Cs_2CO_3$. Any soluble two-valent manganese left was oxidized with a suitable oxidant ($CsMnO_4$, etc.), precipitated as manganese oxide and removed by filtration. The filtrate was evaporated to dryness. The $Cs_2SO_4$ obtained was 99.4% pure.

EXAMPLE VI 100 g $CsMnO_4$ (99.4% $CsMnO_4$, 21.68% Mn, 52.46% Cs) was suspended in 400 ml $H_2O$ in a liter beaker. The suspension was stirred and heated to 65° C. and 12.7 g $CH_3OH$ in 12.7 ml water were gradually added within 45 minutes. The reaction mixture was stirred and kept at 60° C. for another 3 hours or until all seven-valent manganese is reduced to four-valent manganese. (Due to the open beaker some water evaporates.) If the reaction is carried out at room temperature the reduction process will be extended. The solids were separated from the liquid by filtration through a medium-porosity buchner filter funnel, and washed with 100 ml water. 110 g filter cake (15.31% Cs, 0.08% Rb, 0.033% Na, 0.032% K, 0.016% Fe, 19.85% Mn) and 460 ml filtrate and wash (77.54 g/l Cs, 0.23 g/l Rb, 0.0014 g/l Na, 0.043 g/l K, 0.0005 g/l Mn) were obtained. The cesium extraction from the $CsMnO_4$ is at this point 68% and the molar ratio Mn:Cs in the filter cake is 1:0.32.

The $Cs_2CO_3$ in the filtrate can be recovered as such or be converted into any suitable cesium compound by addition of the corresponding acid followed by evaporation and crystallization.

The 110 g filter cake were suspended in 220 ml of a solution containing 68.2 g/l $MnSO_4$. The reaction mixture was stirred and heated and kept at 50° C. for 10 hours. It was filtered through a medium-porosity buchner filter funnel, washed with 100 ml water and 155 g filter cake (17.6% Mn, 0.17% Cs) and 260 ml filtrate and wash (63.7 g/l Cs, 0.24 g/l Rb, 0.03 g/l Na, 0.032 g/l K) were obtained.

Any soluble two-valent manganese left was oxidized with a suitable oxidant ($CsMnO_4$, etc.), precipitated as manganese oxide and removed by filtration. Other manganese salts can be used in this ion exchange reaction such as $MnCl_2$, $MnNO_3$, $MnCO_3$, etc. to obtain the cesium salt needed. The filtrate was evaporated to dryness and 22.7 g $Cs_2SO_4$ (72.87% Cs, 0.11% Rb, 0.008% K, 0.0006% Na) were obtained. The extraction of cesium from the $CsMnO_4$ was 68% as $Cs_2CO_3$ and 31.5% as $Cs_2SO_4$ which totals 99.5%. The purity of the product is higher than 99.7%.

In the recovery of cesium from the cesium containing delta $MnO_2$, any compounds known to ion exchange alkali in alkali-containing delta $MnO_2$'s can be used. As for example compounds of zinc, calcium, barium, copper, cobalt, nickel, etc., being polyvalent metal salts of strong mineral acids.

I claim:

1. A process for recovering cesium from a cesium-bearing mineral wherein the finely-divided mineral is roasted in admixture with an alkaline flux to convert the cesium to a water-soluble salt, the roasted mineral is extracted with water to obtain an aqueous solution of the cesium salt together with soluble salts and/or hydroxides of other alkali and alkaline earth metals, and the aqueous solution is separated from the residual solids, wherein the improvement comprises:
   (a) adding a water-soluble permanganate to said aqueous solution and selectively precipitating cesium permanganate ($CsMnO_4$) in the presence of the other soluble metal compounds; and
   (b) separating the precipitate from the residual solution to obtain $CsMnO_4$ of high purity.

2. The process of claim 1 in which said alkaline flux contains a chloride salt for converting said cesium to cesium chloride.

3. The process of claim 1 in which said alkaline flux is selected from the group consisting of (i) CaO and $CaCl_2$, (ii) $CaCl_2$ and $CaCO_3$; and (iii) NaCl and $Na_2CO_3$.

4. The process of claim 1 wherein said cesium-bearing mineral is pollucite.

5. The process of claim 1 wherein said water-soluble permanganate is potassium permanganate ($KMnO_4$).

6. The process of claim 1 in which the separated $CsMnO_4$ precipitate is reacted with a permanganate reducing agent to obtain cesium carbonate ($Cs_2CO_3$) and cesium delta manganese dioxide ($Cs_xMn_4O_{8-9}$ wherein x=0.8 to 2).

7. A process for recovering cesium from pollucite mineral wherein the finely divided mineral is roasted with an alkaline flux containing a chloride salt to convert the cesium to cesium chloride (CsCl), and the roasted mineral is extracted with water to obtain an aqueous solution of the CsCl together with other alkali metal chloride including rubidium chloride, and the aqueous solution is separated from the residual solids, wherein the improvement comprises:
   (a) adding potassium permanganate ($KMnO_4$) to said aqueous solution to selectively precipitate cesium permanganate ($CsMnO_4$); and
   (b) separating the precipitate from the residual solution of the other alkali metal chlorides to obtain $CsMnO_4$ of high purity.

8. The process of claim 7 in which said alkaline flux contains a mixture of $CaCl_2$ and CaO or $CaCO_3$.

9. The process of claim 7 in which said alkaline flux contains a mixture of NaCl and $Na_2CO_3$.

10. The process of claim 7 in which the separated $CsMnO_4$ precipitate is reacted with a permanganate reducing agent to obtain cesium carbonate and cesium delta manganese dioxide.

11. The process of claim 1 in which said extraction and separation steps are carried out an an alkaline pH at which iron and aluminum form insoluble hydroxides.

12. The process of claim 7 in which said extraction and separation steps are carried out at an alkaline pH at which iron and aluminum form insoluble hydroxides.

* * * * *